United States Patent [19]

Hanaoka

[11] Patent Number: 5,581,477

[45] Date of Patent: Dec. 3, 1996

[54] GRANULATION WATER CONTROL APPARATUS FOR GRANULATING MACHINE USED IN GRANULAR FERTILIZER PRODUCTION PROCESS AND ITS GRANULATION WATER CONTROL METHOD

[75] Inventor: Hiroshi Hanaoka, Tokyo, Japan

[73] Assignee: NEC Corporation, Tokyo, Japan

[21] Appl. No.: 972,031

[22] Filed: Nov. 9, 1992

[30] Foreign Application Priority Data

Nov. 8, 1991 [JP] Japan ................................. 3-292946

[51] Int. Cl.$^6$ ................................................. C01B 31/14
[52] U.S. Cl. ........................... 364/500; 364/469.1; 425/6; 425/7; 425/8; 425/135; 425/222; 264/9
[58] Field of Search ........................... 364/500, 468; 425/6, 7, 8, 135, 222, DIG. 20; 264/9

[56] References Cited

U.S. PATENT DOCUMENTS

| | | | |
|---|---|---|---|
| 3,880,968 | 4/1975 | Kaspar et al. | 264/37 |
| 4,698,190 | 10/1987 | Shibata et al. | 264/40.2 |
| 4,832,700 | 5/1989 | Kaspar et al. | 23/313 |
| 4,902,210 | 2/1990 | Shibata | 425/6 |
| 5,124,100 | 6/1992 | Nishii et al. | 264/82 |
| 5,319,563 | 6/1994 | Hanaoka et al. | 364/468 |
| 5,350,567 | 9/1994 | Takeda et al. | 422/111 |

FOREIGN PATENT DOCUMENTS

| | | |
|---|---|---|
| 1275490 | 4/1988 | Japan . |
| 5132386 | 11/1991 | Japan . |
| 5238863 | 2/1992 | Japan . |
| 5262590 | 3/1992 | Japan . |

*Primary Examiner*—Emanuel T. Voeltz
*Assistant Examiner*—Patrick J. Assouad
*Attorney, Agent, or Firm*—Foley & Lardner

[57] ABSTRACT

A granulation water control apparatus for a granulating machine used in a granular fertilizer production process and its granulation water control method. A particle size weight distribution of a semi-fabricated fertilizer discharged from the granulating machine is calculated, and a central particle size of the particle size weight distribution is calculated. The calculated central particle size and a previously set target central particle size are compared, and if they do not agree, a quantity of the granulation water to be charged into the granulating machine is calculated in accordance with a difference between the calculated central particle size and the target central particle size and the past statistical data.

13 Claims, 6 Drawing Sheets

5,581,477

GRANULATION WATER CONTROL APPARATUS FOR GRANULATING MACHINE USED IN GRANULAR FERTILIZER PRODUCTION PROCESS AND ITS GRANULATION WATER CONTROL METHOD

BACKGROUND OF THE INVENTION

1. Field of the Invention

This invention relates to a granulation water control apparatus for a granulating machine which is used in a granular fertilizer production process and to its granulation water control method.

2. Description of the Prior Art

The process for producing a granular fertilizer which has nitrogen fertilizer, phosphoric fertilizer and the like as fertilizer components contains a granulation process using a cylindrical granulating machine. This granulation process granulates by rotating the granulating machine body while feeding fertilizer raw material, water and the like into the body.

In such a granulation process, it is necessary to adjust the mixing ratio of fertilizer raw material and water (granulation water) in order to produce a fertilizer with good yield. This adjustment of the mixing ratio has been conventionally effected depending on the experience and perception of an operator. But, Japanese Patent Application Laid-open No. 1-275490 discloses a technique which adjusts the mixing ratio automatically. This disclosed technique will be summarized as follows.

(a) A weight ratio which is seen when granulation is ideally effected is set previously.

The weight ratio is a ratio of weight of a granulated fertilizer with an allowable particle size range, weight of a granulated fertilizer with a particle size smaller than the allowable particle size range, and weight of a granulated fertilizer with a particle size larger than the allowable particle size range.

(b) The granulated fertilizer actually discharged from a granulating machine is measured for its particle size to calculate a weight ratio.

(c) The weight ratios in the above (a) and (b) are compared to judge granulation conditions.

(d) According to the judgment of the above (c), a quantity of the granulation water which is fed to the granulating machine is decided.

Specifically, when the granulated fertilizer tends to have a larger particle size, the quantity of the granulation water is decreased. When the granulated fertilizer tends to have a smaller particle size, the quantity of the granulation water is increased.

In case of judging the granulation condition based on the weight ratio, however, there is a drawback that a yield is not good because a change in granulation condition cannot be detected quickly. For example, as shown in FIG. 7, suppose a case that an allowable particle size range is 1.75 to 4.5 mm. Even when a state that the central particle size is almost at the intermediate point between 1.75 mm and 4.5 mm as shown in FIG. 7A has a tendency to change to a state that the central particle size becomes a larger size as shown in FIG. 7B, the weight ratio itself does not change very much. Then, when the change in weight ratio is detected, recovery of a yield takes substantial time in view of the characteristics of granulation control (requiring a certain time from charging of raw material to taking out a product) because the timing of controlling has been already delayed. As a result, a large decline of the yield is caused.

And, the above technique also has a drawback that accurate control of the granulation water cannot be effected because the change in granulation state is not correctly reflected in the weight ratio. For example, when the granulated fertilizer changes from a tendency falling in a large size to a tendency becoming a very small size, the weight of the granulated fertilizer with a large size and that of the granulated fertilizer with a small size increase simultaneously, so that the change in granulation condition does not appear in the weight ratio.

Further, there is a case that the granulation condition is quite different in weight ratio from that obtained when the granulation is ideally made due to differences in pulverizing condition of solid raw material and conditions such as temperature, humidity and the like. When the control aiming at the above weight ratio is effected under such poor conditions, there is a drawback that the control is biased because the pulverization condition cannot be put close to the target condition even after the lapse of time. When such a biased control is effected, in the worst case, the fertilizer becomes like mud or sand, resulting in a uncontrollable state.

SUMMARY OF THE INVENTION

The first object of this invention is to provide a granulation water control apparatus for a granulating machine capable of controlling the granulation water quickly and its granulation water control method.

The second object of this invention is to provide a granulation water control apparatus for a granulating machine capable of exactly detecting a change in granulation condition and correctly controlling the granulation water and its granulation water control method.

The third object of this invention is to provide a granulation water control apparatus for a granulating machine capable of controlling the granulation water without bias even under poor granulation conditions and its granulation water control method.

And, the final object of this invention is to realize the above control of the granulation water, thereby improving a yield.

In order to accomplish the above objects, the granulation water control apparatus for controlling a quantity of the granulation water charged into the granulating machine used in the granular fertilizer production process of this invention contains a particle size measuring means for measuring a particle size of a semi-fabricated fertilizer discharged from the granulating machine, a particle size weight distribution calculating means for calculating a particle size weight distribution in accordance with the measured particle size, a central particle size calculating means for calculating a central particle size of the particle size weight distribution, a particle size comparing means for comparing the calculated central particle size and a previously set target central particle size, and when the above calculated central particle size does not agree with the above target central particle size, a water quantity calculating means for calculating a quantity of the granulation water charged into the above granulating machine according to a difference between the calculated central particle size and the target central particle size.

The above central particle size calculating means averages the particle size weight distributions ranging from the present to the past several times and calculates a central particle size of the mean particle weight distribution. Further, the above particle size comparing means regards the above calculated central particle size and the above target central particle size as agreed when the difference between the above calculated central particle size and the above target central particle size is smaller than the previously set value.

The above water quantity calculating means, when the above estimated central particle size is larger than the target central particle size, decreases the quantity of the granulation water charged into the granulating machine according to the above difference, and when the above estimated central particle size is smaller than the target central particle size, increases the quantity of the granulation water charged into the granulating machine according to the above difference.

And, a range in which the above water quantity is decreased or increased by the above water quantity calculating means is about 0.1 to 5% of the water quantity set presently.

The granulation water control apparatus for controlling a quantity of the granulation water charged into the granulating machine used in the granular fertilizer production process according to another embodiment of this invention for accomplishing the above objects contains a particle size measuring means for measuring a particle size of the semi-fabricated fertilizer discharged from the granulating machine, a particle size weight distribution calculating means for calculating a particle size weight distribution based on the above measured particle size, a central particle size calculating means for calculating a central particle size of the above particle size weight distribution, and a water quantity calculating means for calculating the quantity of the granulation water charged into the above granulating machine in accordance with the above calculated particle size, the above target central particle size and the past statistical data.

And, the above water quantity calculating means contains a means for obtaining a dispersion value from the calculated central particle size and the past data of water quantity, a means for obtaining an increase and decrease ratio of the water quantity against the granulation water quantity at the start of control in accordance with the above dispersion value, and a means for calculating the actual quantity of the granulation water from the increase and decrease ratio of the above water quantity.

Further, a particle size comparing means for comparing the above calculated central particle size and the previously set target central particle size is provided and, as a result of comparison by the above particle size comparing means, when the above calculated central particle size does not agree with the above target central particle size, the above water quantity calculating means calculates a quantity of the granulation water.

And, the above particle size comparing means, when the difference between the above calculated central particle size and the above target central particle size is smaller than the previously set value, regards the above calculated central particle size and the above target central particle size as agreed. The above central particle size calculating means averages the particle size weight distributions ranging from the present to past several times and calculates the mean central particle size of the particle size weight distribution. Further, the range of decrease and increase of the above water quantity by the above water quantity calculating means is about 0.1 to 5% of the water quantity set presently.

The granulation water control method for controlling a quantity of the granulation water charged into the granulating machine used in the granular fertilizer production process of this invention for accomplishing the above objects includes a step of calculating a particle size weight distribution of the semi-fabricated fertilizer discharged from the above granulating machine, a step of calculating a central particle size of the above particle size weight distribution, a step of comparing the above calculated central particle size and the above target central particle size, a step of calculating a difference between the above calculated central particle size and the above target central particle size when the above calculated central particle size and the above target central particle size do not agree with each other, and a step of calculating a quantity of the granulation water charged into the above granulating machine according to the above calculated difference.

And preferably, in the above granulation water controlling method, the step of calculating the quantity of the granulation water contains a step of judging whether the above calculated central particle size is larger than the target central particle size, when the above calculated central particle size is larger than the target central particle size, a step of decreasing the water quantity according to the calculated difference, and when the above calculated central particle size is smaller than the target central particle size, a step of increasing the water quantity according to the above calculated difference.

Also preferably, in the above granulation water control method, the step of calculating the quantity of the granulation water contains a step of obtaining a distribution value from the calculated central particle size and the past data of the water quantity, a step of obtaining an increase and decrease ratio of the water quantity against the granulation water quantity at the start of control in accordance with the above distribution value, and a step of calculating an actual quantity of the granulation water from the increase and decrease ratio of the above water quantity.

Other objects, characteristics and effects of this invention will be apparent from the following detailed description.

BRIEF DESCRIPTION OF THE INVENTION

DESCRIPTION OF THE PREFERRED EMBODIMENT

Preferred embodiments of this invention will be described with reference to the drawings.

Figure 1:
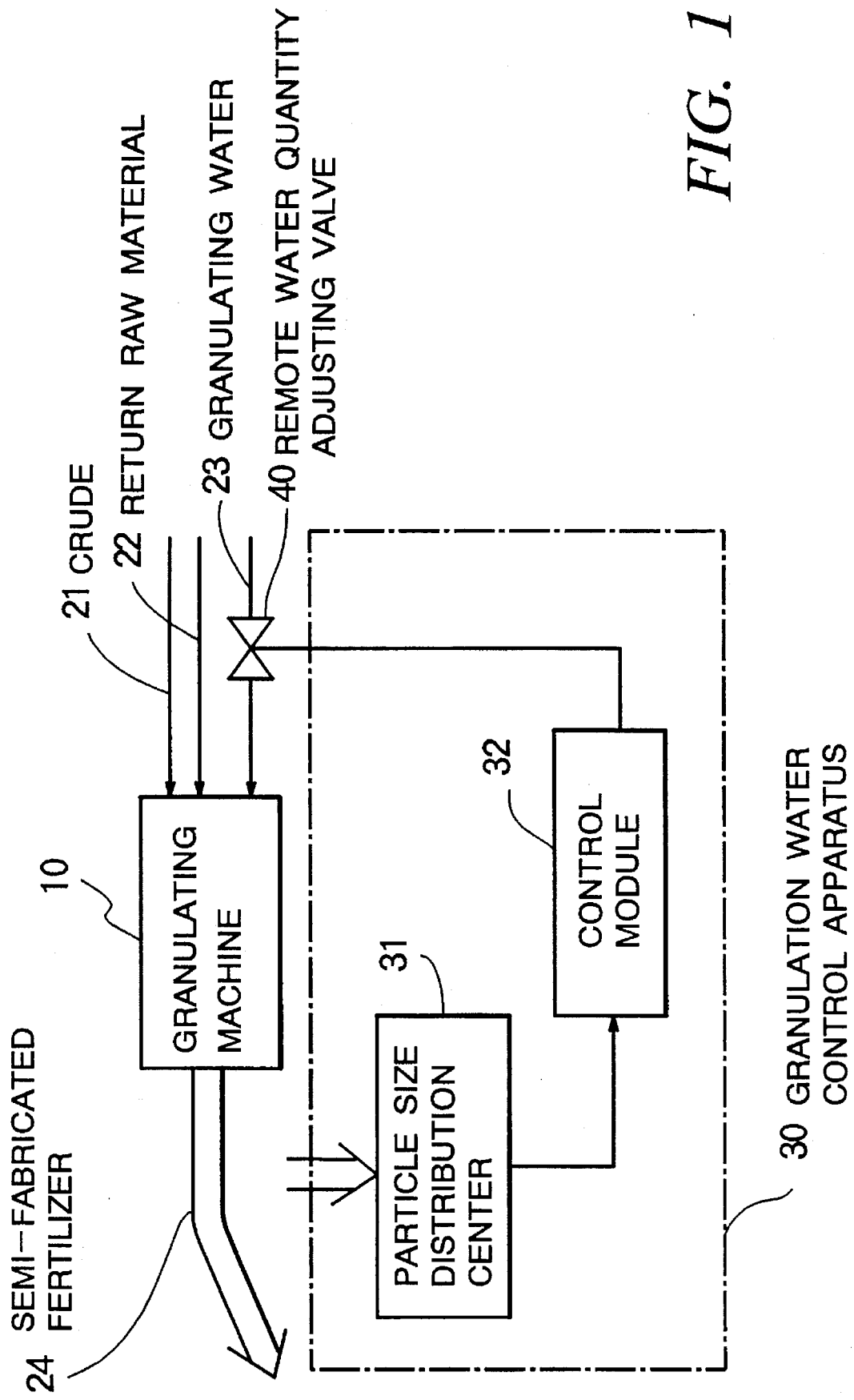
FIG. 1 is a block diagram of a granulating machine and granulation water control apparatus according to one embodiment of this invention.

FIG. 1 is a block diagram showing one embodiment of this invention.

In FIG. 1, 10 is a granulating machine. Into the granulating machine 10, crude 21, return raw material 22 (to be described afterward) and granulation water 23 are charged. The crude 21 mainly consists of liquid raw material and solid raw material. For example, the liquid raw material includes sulfuric acid, ammonia and the like, and the solid raw material includes phosphorus, potassium, nitrogen and the like.

The granulating machine discharges granulated semi-fabricated fertilizer 24, Reference numeral 30 is a granulation water control apparatus for controlling a quantity of the granulation water 23 charged into the granulating machine 10, The granulation water control apparatus 30 contains particle size distribution sensor 31 for obtaining a particle size weight distribution of the semi-fabricated fertilizer 24 discharged from the granulating machine and control module 32 for determining a quantity of the granulation water charged into the granulating machine based on the obtained particle size weight distribution, Reference numeral 40 is a remote water quantity adjusting valve disposed on a pipe through which the granulation water 23 charged into the granulating machine flows. The remote water quantity adjusting valve 40 adjusts the water quantity according to the control signal outputted from the granulation water control apparatus 30.

Figure 2:
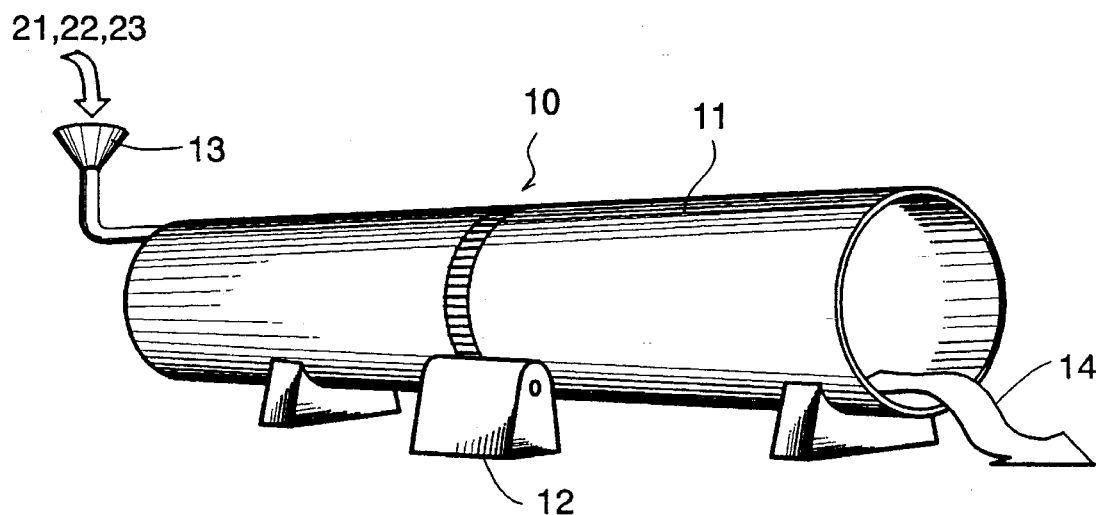
FIG. 2 is a perspective view showing the structure of the granulating machine shown in FIG. 1.

FIG. 2 is a perspective view showing the structure of the granulating machine 10, The granulating machine 10 shown in FIG. 2 is a granular fertilizer generating machine exclusively for a chemical fertilizer. The granulating machine 10 has body 11 of a horizontal cylinder which is wider toward the end and rotated by electric motor 12, The body 11 of the cylinder is made of steel and has a radius of about 2 m and a length of about 10 m. Raw material charging opening 13 and semi-fabricated fertilizer discharging opening 14 are disposed at either end of the body 11 respectively. The electric motor 12 rotates the body 11 at 20 to 30 rpm. And, while rotating the body 11, the crude 21, the return raw material 22 and the granulation water 23 are charged through the raw material charging opening 13. Then, they are granulated while passing through the interior of the body 11. The granulated semi-fabricated fertilizer 24 is discharged through the semi-fabricated fertilizer discharging opening 14. As the semi-fabricated fertilizer 24 discharged from the semi-fabricated fertilizer discharging opening 14 contains a large amount of water, it is subjected to after-treatment for drying and cooling. And, the semi-fabricated fertilizer 24 discharged from the semi-fabricated fertilizer discharging opening 14 has various particle sizes and about 30% of it is below the standard. Therefore, the product below the standard is pulverized and again charged into the granulating machine as the aforementioned return raw material 22.

Figure 3:
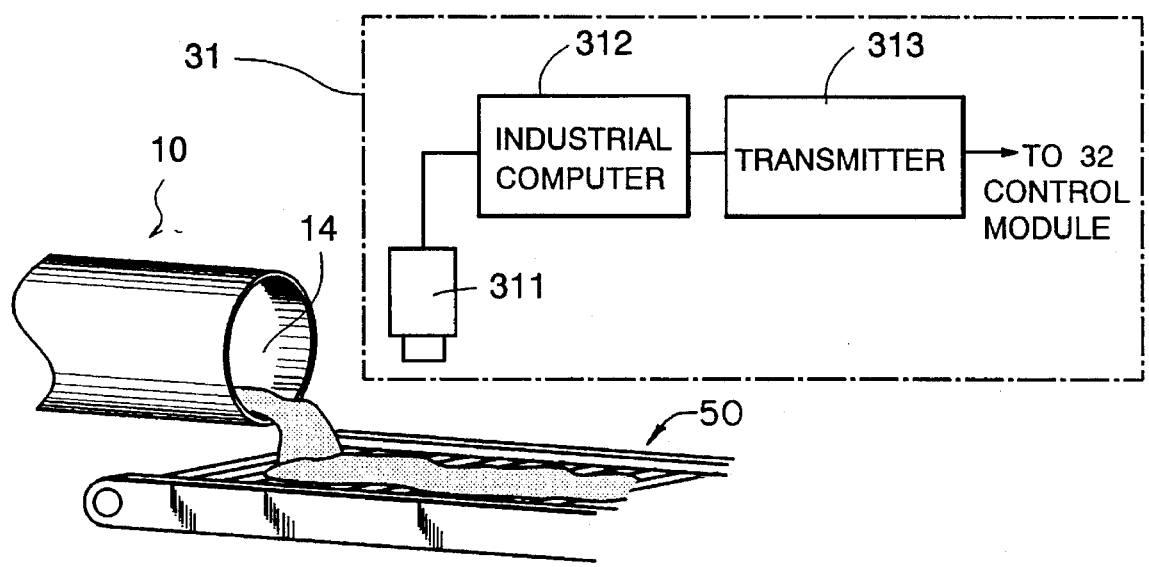
FIG. 3 is a drawing for describing the structure of the particle size distribution sensor shown in FIG. 1.

FIG. 3 is a drawing showing the structure of the particle size distribution sensor 31.

Figure 6:
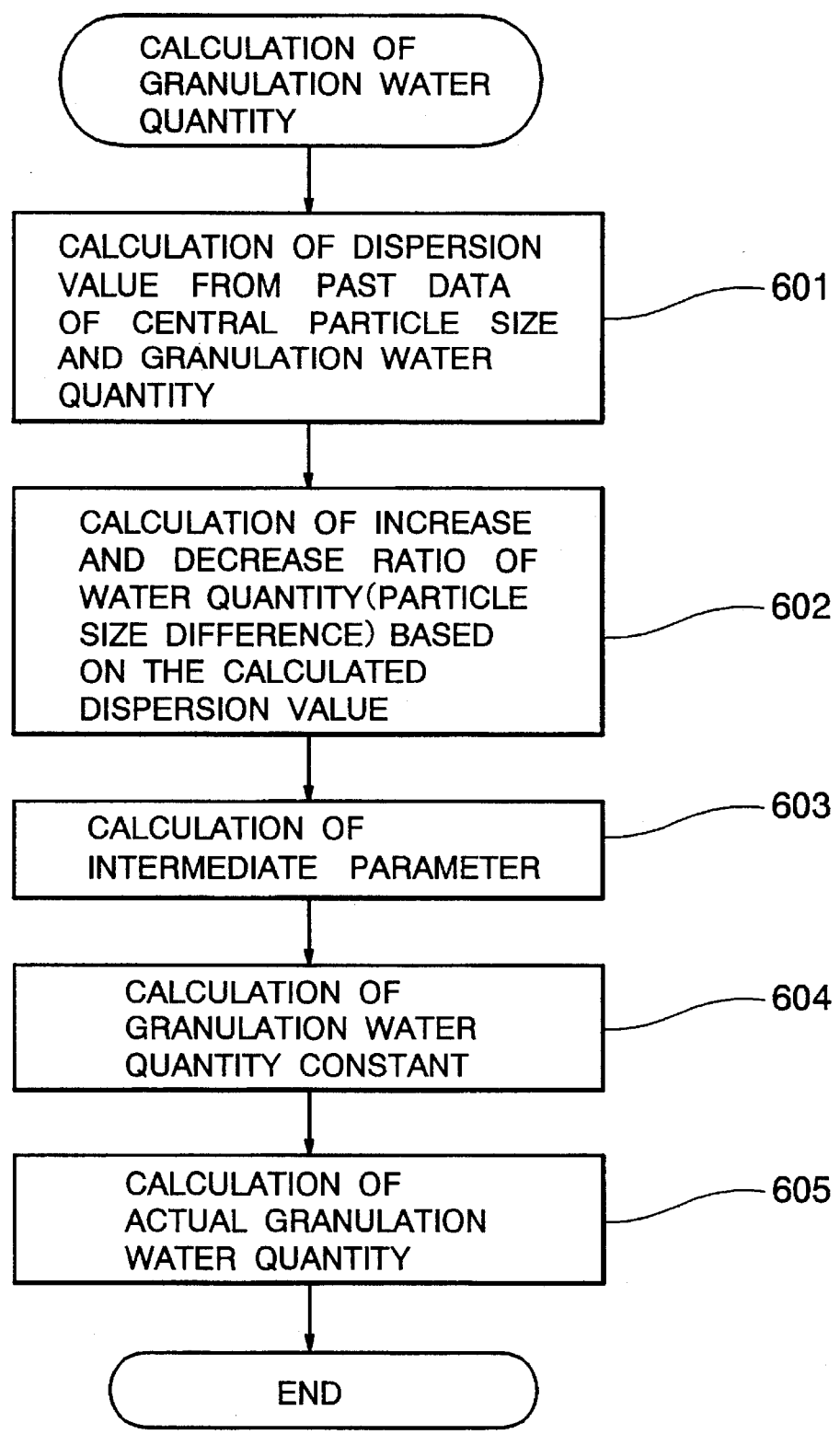
FIG. 6 is a flowchart showing calculation of the granulation water quantity by the control module.
Figure 7A:
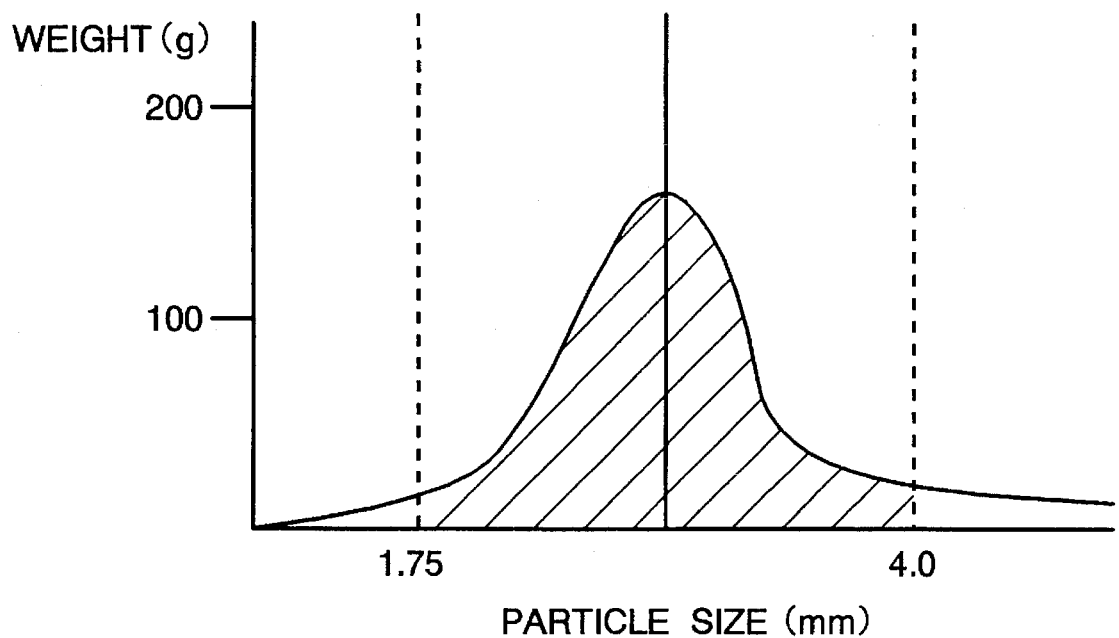
FIG. 7A and 7B are graphs showing a change in weight ratio of the granulated fertilizer produced by the granulating machine.
Figure 7B:
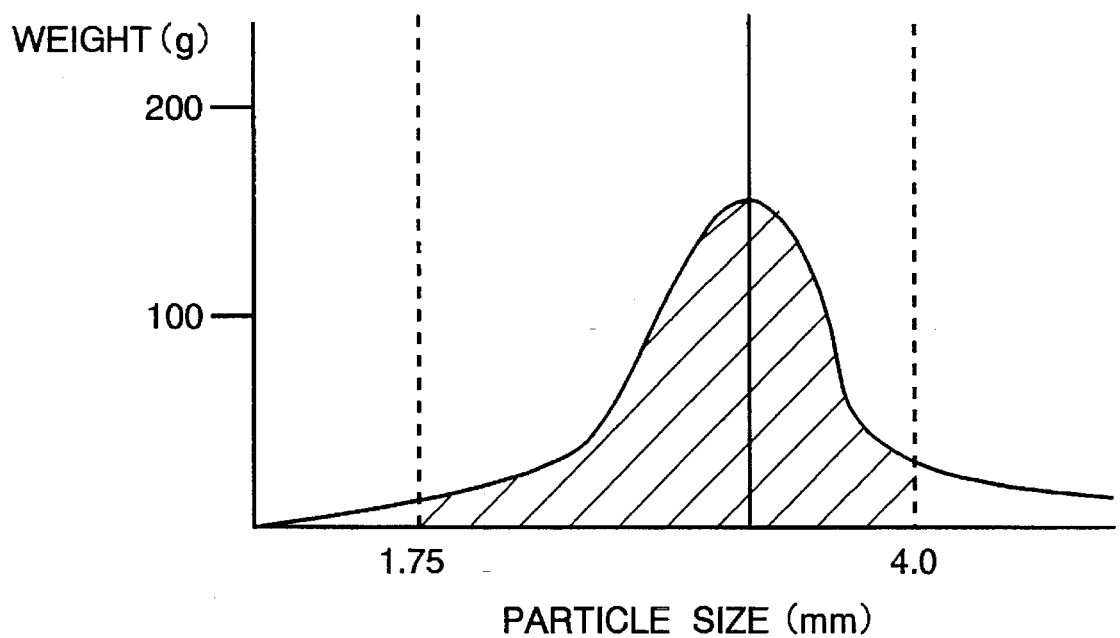

The particle size distribution sensor 31 shown in FIG. 3 contains industrial camera 311, industrial computer 312 and transmitter 313. The industrial camera 311 takes a picture of the semi-fabricated fertilizer 24 which is discharged from the semi-fabricated fertilizer discharging opening 14 and carried on belt-conveyer 50. The industrial computer 312 enters a picture signal from the industrial camera 311 to conduct digital processing and extracts particle size data for counting, thereby calculating particle size weight distribution data. The particle size weight distribution data is the one as shown in FIG. 6 for example. The industrial computer 312 calculates the particle size weight distribution data at intervals of 3 to 4 seconds for example, and outputs its data to the control module 32 via the transmitter 313. The particle size distribution sensor 31 and the control module 32 are independent materialized to each other by separate computers as a core. This is to disperse a load which is great because the particle size distribution sensor 31 executes calculation of the distribution by measuring the particle size in real time.

Figure 4:
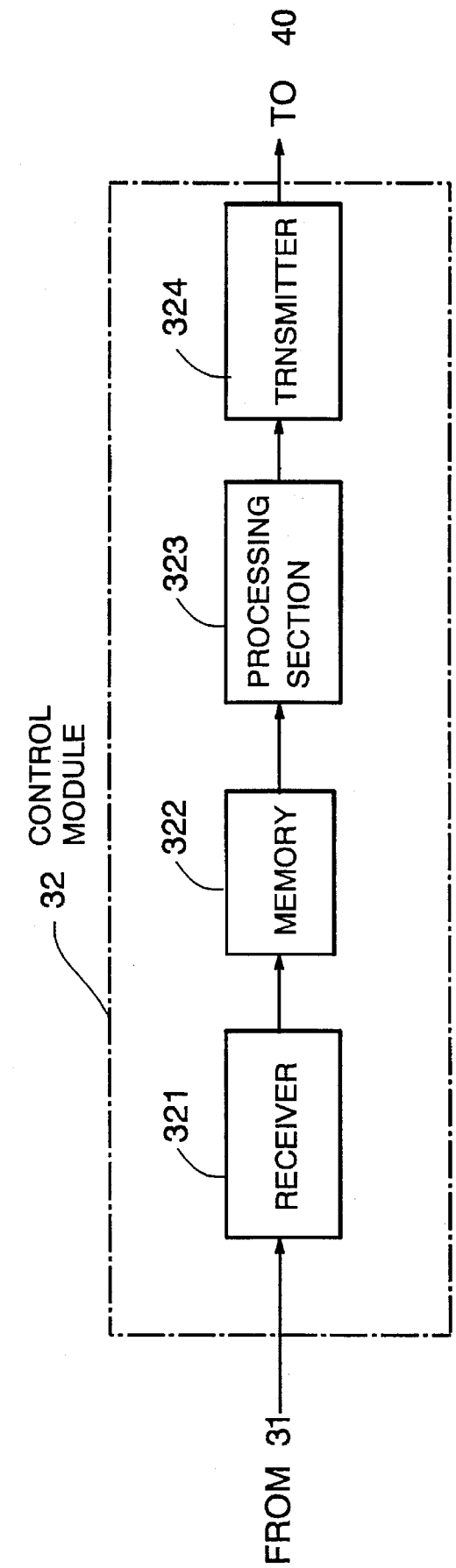
FIG. 4 is a block diagram showing the structure of the control module shown in FIG. 1.

FIG. 4 is a block diagram showing the structure of the control module 32.

The control module 32 shown in FIG. 4 contains receiver 321, memory 322, processing section 323 and transmitter 324. The receiver 321 inputs particle size weight distribution data from the particle size distribution sensor 31. The memory 322 stores the inputted particle size weight distribution data. The processing section 323 executes processing according to the following flowchart. The transmitter 324 sends the control signal from the processing section 323 to the remote water quantity adjusting valve 40.

Figure 5:
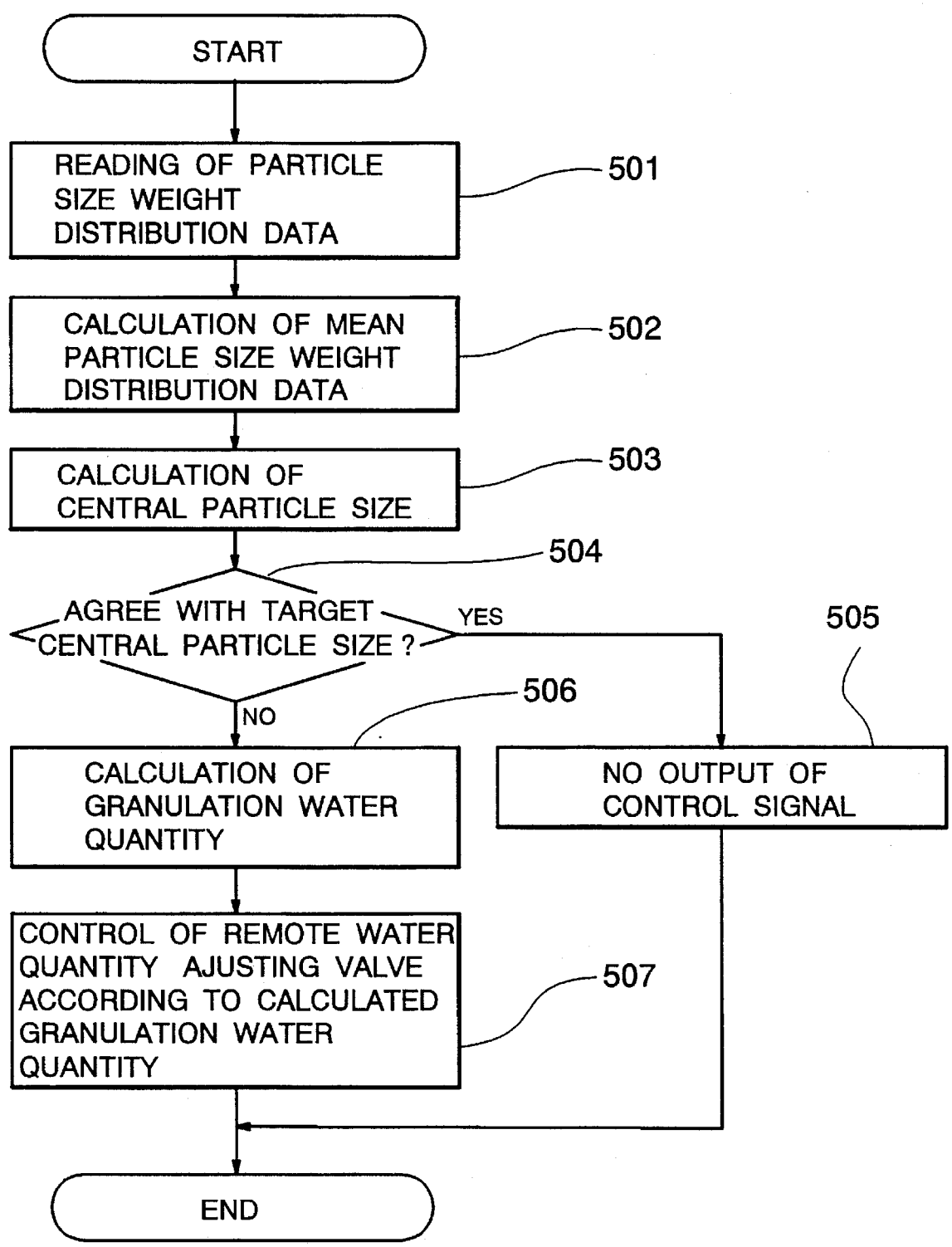
FIG. 5 is a flowchart showing processing made by the processing section of the control module.

FIG. 5 is a flowchart to show processing which is executed by the processing section 323.

The processing section 323 reads the particle size weight distribution data ranging from the present to past several times stored in the memory 322 (step 501).

The read particle size weight distribution data are averaged to calculate the mean particle size weight distribution data (step 502). Thus, the influence of a measurement error is minimized.

And, the central particle size which is a particle size with the most distribution ratio from the mean particle size weight distribution data (step 503). The central particle size is a particle size of the semi-fabricated fertilizer 24 which shows a peak of the weight ratio (indicated in solid line) shown in FIG. 6 for example.

Then, the calculated central particle size and the previously set target central particle size are compared (step 504). The target central particle size is basically the central value of a target product size. But, it is necessary to set an optimum value for each brand in view of the contraction and breakage of the semi-fabricated product in the after-treatment. For example, when the subject semi-fabricated fertilizer 24 has large particles, it is necessary to set the target particle size to a little smaller size. Further, it is necessary to minutely adjust the set value of the target central particle size by several trials. When the difference between the calculated central particle size and the target central particle size is smaller than the previously set value (for example, 0.3 mm or below), they are regarded as agreed.

And, when the calculated central particle size agrees with the target central particle size, it is judged to be a stable condition, and the control signal is not outputted to keep the current setting of the remote water quantity adjusting valve 40 (step 505).

On the other hand, when the calculated central particle size does not agree with the target central particle size, the control value of the granulation water quantity is calculated based on the difference between the central particle size and the target central particle size in view of a change of the central particle size (step 506).

In the calculation of the granulation water quantity, when the calculated central particle size is larger than the target central particle size, a control signal to effect the decrease of the granulation water quantity is outputted, and when the calculated central particle size is smaller than the target central particle size, a control signal to increase the granulation water quantity is outputted.

And, the remote water quantity adjusting valve 40 is controlled based on the value of the calculated granulation water quantity (step 507).

Then, the content of the calculation of the granulation water quantity in step 506 shown in FIG. 5 will be described with reference to the flowchart of FIG. 6.

First, based on the past statistical data of the water quantity and the central particle size calculated in step 503 of FIG. 5, dispersion value P(k) is calculated from the following equation (step 601):

$$P(k)=[1-K(k-1)*U(k-1)]*P(k-1)+R$$

where, K(k) is an increase and decrease ratio of the difference between the target central particle size and the current central particle size, U(k) is a constant (hereinafter referred to as the granulation water quantity constant) indicating the set ratio of the granulation water quantity to a basis granulation water quantity to be described afterward, k is the number of control, and R is noise. Here, the current dispersion value is calculated from the increase and decrease ratio of the previous water quantity K(k-1), the granulation water quantity constant U(k-1) and the dispersion value P(k-1). The granulation water quantity constant U(k) is a value 0 or above and 1 or below.

And, the increase and decrease ratio K(k) is calculated from the following equation based on the dispersion value obtained above (step 602):

$$K(k)=P(k)*U(k-1)*[U(k-1)^2*P(k)+Q]^{-1}$$

where, Q is noise.

When the past granulation water control quantity varies widely (scattering of the central particle size is large), the increase and decrease ratio K(k) of this particle size difference becomes large.

In the granulation process, the correlation between the granulation water quantity and the particle size distribution is not always constant and varies according to temperatures and pulverization conditions of the material. Therefore, as a parameter to show the relation between the granulation water quantity and the particle size distribution, an intermediate parameter is dynamically defined. The current intermediate parameter varies by adding a value resulting from multiplying the difference between the current measured central particle size and the target central particle size by the above increase and decrease ratio K(k) to the past intermediate parameter. Intermediate parameter C(k) is calculated from the following equation (step 603):

$$C(k)=C(k-1)+K(k)*[D(k)-C(k-1)*U(k-1)]$$

where, C(k-1) is the previous intermediate parameter and D(k) is a measured central particle size.

And, based on the target central particle size and the intermediate parameter, the granulation water quantity constant is calculated from the following equation (step 604):

$$U(k)=De/C(k)$$

where, De is a target central particle size.

And lastly, granulation water quantity Ur is calculated from the following equation using basis granulation water quantity Urf and granulation water quantity constant U(k) (step 605):

$$Ur=U(k)*Urf$$

where, the basis granulation water quantity Urf is a granulation water quantity at the start of control. And, the granulation water quantity constant U(k) is formalized by setting to 1 at the start of control.

The control module 32 controls the remote water quantity adjusting valve 40 in accordance with the calculated value of granulation water quantity Ur.

For the target central particle size De, the basis granulation water quantity Urf, and the noise R, Q, the values read from a file prepared for each product and previously developed in the memory 322 are used.

As seen from the above calculation of the granulation water quantity, when the difference between the dispersion value or target central particle size De and the current central particle size D(k) is large, the controlled quantity of the granulation water is large, and when the difference between the dispersion value or target central particle size De and the current central particle size D(k) is small, the controlled quantity of the granulation water is small.

In the process shown in FIG. 5, the target central particle size De and the current central particle size D(k) are compared in step 504, and if there is no difference, the calculation of the granulation water quantity Ur (step 506) and the control of the remote water quantity adjusting valve (step 507) are designed to be omitted.

As it is seen from the equation for calculating the intermediate parameter C(k) in step 603 of FIG. 6, when the difference between the target central particle size De and the current particle size D(k) is substantially nil, the member $[D(k)-C(k-1)*U(k-1)]$ is 0 or nearly 0, so that the granulation water quantity constant U(k) is almost equal to the previous value. As a result, the granulation water quantity Ur keeps the previous value.

Therefore, the processes of steps 506 and 507 may be conducted directly without effecting the processes of steps 504 and 505 in FIG. 5. But, comparing the target central particle size and the current central particle size can make the processing time of step 506 short.

The range in which the water quantity increases or decreases is determined according to the difference between the calculated central particle size and the target central particle size but limited to about 0.1 to 5% of the water quantity currently set.

And, the interval of controlling the granulation water by the above control module 32 is based on the time between the start of controlling the granulation water and the appearance of change in the granulation state of the semi-fabricated fertilizer 24 discharged from the semi-fabricated fertilizer discharging opening 14. This time is about 4 minutes for an ordinary brand. This time is based on the period that the raw material moves from the raw material charging opening 13 of the granulating machine to the semi-fabricated fertilizer discharging Opening 14. But, this control interval has to be minutely adjusted by conducting several trials.

As described above, as this invention presumes the granulation state in accordance-with the central particle size, it can detect the change in granulation state before the appearance of the change in weight ratio or the change in yield. Therefore, the granulation water can be controlled before the appearance of change in yield, and the time that the change in granulation state influences the yield can be shortened. And, as this invention presumes the granulation state in accordance with the central particle size, even a change of granulation state which does not appear as a change of weight ratio can be exactly detected. Therefore, the granulation water can be controlled more precisely.

Further, as this invention limits the range in which the water quantity is increased or decreased by one control to about 0.1 to 5% of the water quantity currently set, a direct value is not required to be set even when an ordinary yield cannot be attained due to various causes such as failure in the start-up process and the state of crude. That is to say, the granulation water can be controlled without inclination even in a poor granulation state.

Thus, in this invention the granulation water can be controlled quickly and exactly and without inclination, so the yield is improved remarkably.

It is to be understood that modification and variation of this invention is possible in addition to the aforementioned embodiments.

For example, as the particle size distribution sensor 31, in addition to those described in the above embodiments, there is a mechanical sensor for measuring the distribution from the weight of the semi-fabricated fertilizer left in a sieve by putting the semi-fabricated fertilizer through the sieve having a certain screen opening and an optical sensor for measuring the distribution from the time that the semi-fabricated fertilizer crosses the light path between luminous elements (such as LED). It is to be understood that all the modified embodiments made without departing from the spirit and scope of this invention is included in the accompanying claims.

What is claimed is:

1. A granulation water control apparatus for controlling a quantity of granulation water charged into a granulating machine which is used in a granular fertilizer production process comprising:

a central particle size calculating means for calculating a central particle size from a particle size weight distribution, a grain size comparing means for comparing said calculated central particle size and a previously set target central particle size, and a water quantity calculating means for calculating the quantity of the granulation water charged into said granulating machine in accordance with the difference between said calculated central particle size and said target central particle size when said calculated central particle size does not agree with said target central particle size, wherein said central particle size calculating means averages the particle size weight distributions ranging from the present to the past several times and calculates the central particle size of the mean particle size weight distribution.

2. A granulation water control apparatus according to claim 1, wherein said particle size comparing means regards said calculated central particle size and said target central particle size as agreed when the difference between said calculated central particle size and said target central particle size is smaller than a previously set value.

3. A granulation water control apparatus according to claim 1, wherein said water quantity calculating means, when said estimated central particle size is larger than said target central particle size, decreases the quantity of the granulation water to be charged into said granulating machine in accordance with said difference and when said estimated central particle size is smaller than said target central particle size, increases the quantity of the granulation water to be charged into said granulating machine in accordance with said difference.

4. A granulation water control apparatus according to claim 3, wherein a range in which said water quantity is increased or decreased by said water quantity calculating means is about 0.1 to 5% of the water quantity currently set.

5. A granulation water control apparatus for controlling a quantity of granulation water charged into a granulating machine which is used in a granular fertilizer production process comprising:

a particle size measuring means for measuring a particle size of a semi-fabricated fertilizer which is discharged from said granulating machine, a particle size weight distribution calculating means for calculating a particle size weight distribution in accordance with said measured particle size, a central particle size calculating means for calculating a central particle size of said particle size weight distribution, and a water quantity calculating means for calculating the quantity of the granulation water which is charged into said granulating machine in accordance with said calculated central particle size, said target central particle size and the past statistical data, wherein said water quantity calculating means contains a means for obtaining a dispersion value from the calculated particle size and the past data of the water quantity, a means for obtaining an increase and decrease ratio of the water quantity to the granulation water quantity at the start of control in accordance with said dispersion value, and a means for calculating an actual quantity of the granulation water form said increase and decrease ratio of the water quantity.

6. A granulation water control apparatus according to claim 5, which further comprises a particle size comparing means for comparing said calculated central particle size and the previously set target central particle size and, as a result of the comparison by said particle size comparing means, said water quantity calculating means calculates a quantity of the granulation water only when said calculated central particle size does not agree with said target central particle size.

7. A granulation water control apparatus according to claim 6, wherein said particle size comparing means regards said calculated central particle size and said target central particle size as agreed when the difference between said calculated central particle size and said target central particle size is smaller than the previously set value.

8. A granulation water control apparatus according to claim 5, wherein said central particle size calculating means averages the particle size weight distributions from the present to the past several times and calculates a central particle size of the mean particle size weight distribution.

9. A granulation water control apparatus according to claim 5, wherein a range in which said water quantity is increased or decreased by said water quantity calculating means is about 0.1 to 5% of the water quantity currently set.

10. A granulation water control method for controlling a quantity of granulation water charged into a granulating machine used in a granular fertilizer production process, comprising the steps of:

calculating a particle size weight distribution of a semi-fabricated fertilizer discharged from said granulating machine, calculating a central particle size of said particle size weight distribution, comparing said calculated central particle size and a previously set target central particle size, calculating a difference between said calculated central particle size and said target central particle size when said calculated central particle size does not agree with said target central particle size, and calculating a quantity of the granulation water charged into said granulating machine in accordance with said calculated difference, wherein the step of calculating the quantity of the granulation water comprises a step of obtaining a distribution value from said calculated central particle size and the past data of the water quantity, a step of obtaining the increase and decrease ratio of the water quantity against the granulation water quantity at the start of control in accordance with said distribution value, and a step of calculating an actual quantity of the granulation water from an increase and decrease ratio of said water quantity.

11. A granulation water control method according to claim 10, wherein said step for calculating the quantity of the granulation water comprises:

a step of judging whether said calculated central particle size is larger than the target central particle size, when said calculated central particle size is larger than the target central particle size, a step of decreasing the water quantity in accordance with said calculated difference, and when said calculated central particle size is smaller than the target central particle size, a step of increasing the water quantity in accordance with said calculated difference.

12. A granulation water control apparatus for controlling a quantity of granulation water charged into a granulating machine which is used in a granular fertilizer production process comprising:

a particle size measuring means for measuring a particle size of a semi-fabricated fertilizer discharged from said granulating machine;

a particle size weight distribution measuring means for measuring a particle size weight distribution in accordance with the measured particle size;

a central particle size calculating means for calculating a central particle size of said particle size weight distribution;

a grain size comparing means for comparing said calculated central particle size and a previously set target central particle size; and a water quantity calculating means for calculating the quantity of the granulation water charged into said granulating machine in accordance with a difference between said calculated central particle size and said target central particle size when said calculated central particle size does not agree with said target central particle size;

wherein said central particle size calculating means averages a plurality of particle size weight distributions and calculates the central particle size of the mean particle size weight distribution, wherein said particle size comparing means regards said calculated central particle size and said target central particle size as agreed when the difference between said calculated central particle size and said target central particle size is smaller than a previously set value, and wherein when said estimated central particle size is larger than said target central particle size, said water quantity calculating means decreases the quantity of the granulation water to be charged into said granulating machine in accordance with said difference and when said estimated central particle size is smaller than said target central particle size, said water quantity calculating means increases the quantity of the granulation water to be charged into said granulating machine in accordance with said difference.

13. A granulation water control apparatus according to claim 12, wherein a range in which said water quantity is increased or decreased by said water quantity calculating means is about 0.1 to 5% of the water quantity currently set.

* * * * *